Dec. 12, 1950     F. L. FULKE     2,533,572
MINING MACHINE
Filed Sept. 25, 1946
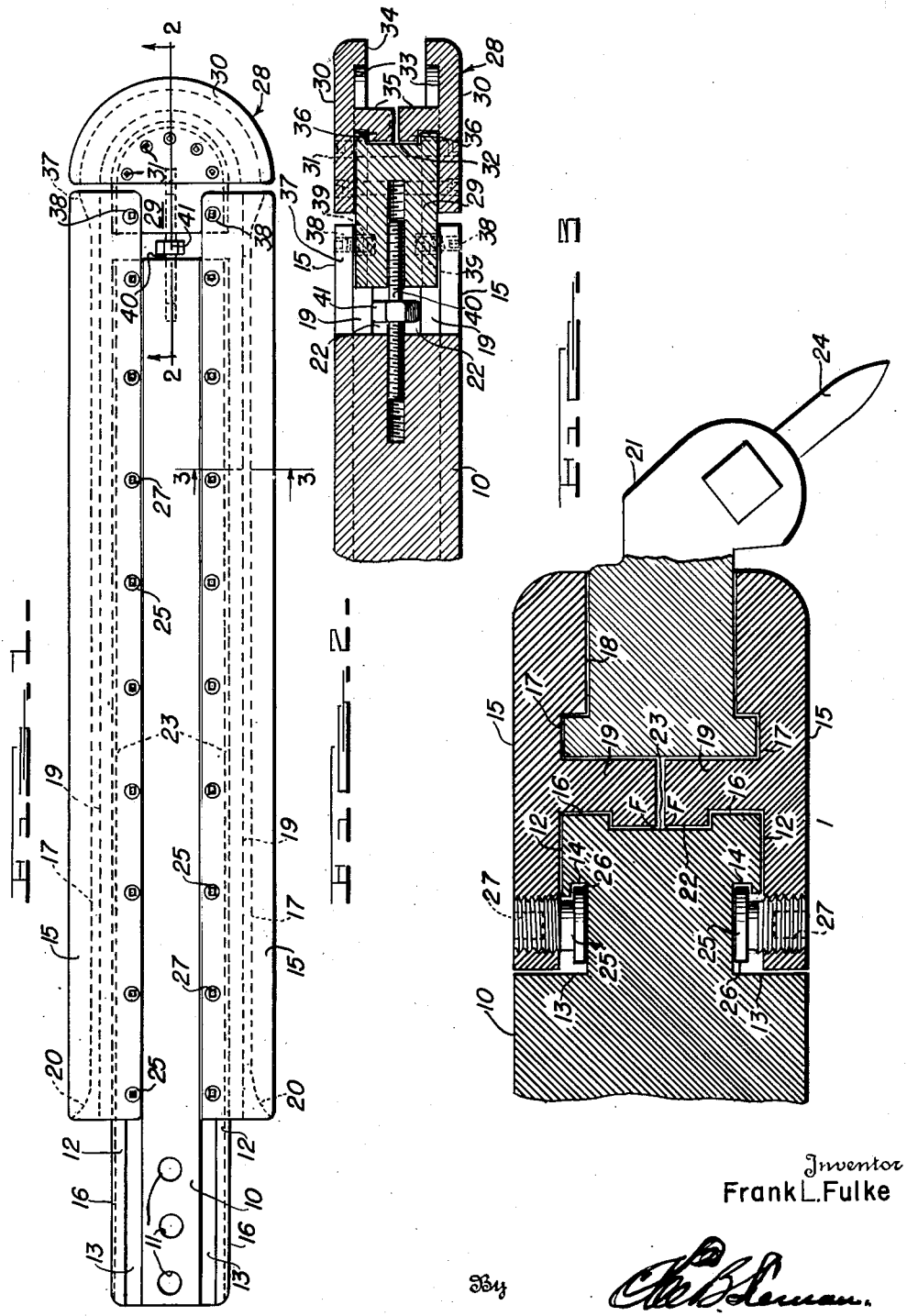
Inventor
Frank L. Fulke
By
Attorney Patented Dec. 12, 1950

2,533,572

UNITED STATES PATENT OFFICE 2,533,572

MINING MACHINE

Frank L. Fulke, Terre Haute, Ind.

Application September 25, 1946, Serial No. 699,124

8 Claims. (Cl. 262—33)

This invention relates to a cutter bar for use with conventional cutting machines to support and guide the endless cutting chain. Such cutting machines are used extensively in mining operations to cut coal and the like. The chain guideways of such cutter bars are subject to extreme wear from the movement of the endless chain, which makes necessary frequent replacement of either the entire cutter bar or the worn parts. The chain guiding surfaces of cutter bars also are subject to excessive and uneven stresses caused by the angularity at which the cutting teeth or bits are mounted on the endless cutting chain.

Therefore, it is an object of this invention to provide a cutter bar with chain guideways which easily may be adjusted to compensate for looseness, caused by wear on the cutting chain and/or the guideways, without taking the cutter bar apart or replacing worn parts.

Another object of the invention is to provide a cutter bar with cutting chain guideways which have improved means for resisting the severe angular stresses of the chain which tend to pry the guideways apart.

A further object of the invention is to provide a cutter bar with simple endless chain tensioning means, the operation of which moves the chain guideways as a unit and, hence, does not cause gaps or open spaces in the guideways.

Still another object of the invention is to provide a strong cutter bar of simple and inexpensive construction which will be dependable in operation and easy to maintain.

Other objects, advantages, and economies of the invention will be apparent from the following description and accompanying drawings in which:

Figure 1 is a plan view of a cutter bar embodying the invention.

Figure 2 is a cross-sectional view taken on line 2—2 of Figure 1.

Figure 3 is a cross-sectional view taken on line 3—3 of Figure 1, and showing an endless cutting chain in operating position on the cutter bar.

Referring now to Figure 1, the cutter bar has a substantially flat central supporting bar 10, the rearward end of which is adapted to be attached to a cutting machine, not shown, by means of bolts, or the like extending through suitable holes 11 formed in the bar. The top and bottom sides of the bar 10 are offset, as indicated at 12, adjacent the longitudinal marginal edges thereof, as best shown in Figure 3. The inner margin of each of the offset portions 12 of the bar 10 is provided with a longitudinally extending groove 13, laterally undercut as indicated at 14. Mounted over each of the offset portions of the bar are chain guiding plates 15 which overhang the lateral edges 16 of the bar and are longitudinally grooved as at 17 to form a T-shaped chain-guiding channel 18. The plates 15 have longitudinally extending flanges 19 which overlie the lateral edges 16 of the bar 10 to form the bottom of the chain guiding channel 18. The groove 17 may be widened or flared adjacent the rearward end of the plates 15, as shown at 20 in Figure 1, to form entrance and exit openings for the endless cutting chain 21, shown in Figure 3.

The flanges 19 have longitudinally extending ribs 22 which project into a longitudinally extending groove 23 formed in the lateral edges 16 of the bar 10. The cooperating ribs 22 and groove 23 provide an interlocking connection between the plates 15 and the bar 10 which resists any chain or other forces tending to separate the sides of the channel 18 or to separate the plates 15 from the bar 10, transversely of the edge 16. Such chain forces usually are caused by the angularity at which the bits or teeth 24 are positioned on the chain. It will be seen that the walls of the chain guiding channel 18 are constituted almost entirely by the guide plates 15, with the flanges 19 receiving the back thrust of the chain 21.

The plates 15 are attached to the supporting bar 10 by a series of screws 25 threaded into suitable apertures formed in the plates. The screws 25 have a flanged nose or head 26 which projects into the undercut portion 14 of the grooves 13 to retain the plates 15 on the bar 10, as best shown in Figure 3. To permit the screws 25 to be substantially flush with the top and bottom surfaces of the cutter bar, a tool receiving aperture 27 is provided in each screw. From this construction, it will be apparent that when the screws 25 are loose the plates 15 are slidable longitudinally on the bar 10.

A further feature of this novel mounting lies in the fact that adjustment of the screws 25 varies the width of the chain guiding channel 18. The clearances between the nose 26 of the screws and the undercut portion 14 of the groove, between the lateral edges 16 of the bar and the flanges 19, and between the ribs 22 and the groove 23, is such that advancement of the screws forces the inner edge of the plate 15 away from the offset portion 12, thereby tilting the outer edge of the plate toward the outer edge of the companion plate mounted on the opposite side of the bar 10, thus narrowing the channel 18 formed between the plates. This tilting takes place about fulcrum lines F between each rib 22 and the groove 23. Since the distance between the fulcrum lines F and the screws 25 is somewhat less than the distance between the fulcrum lines and the outer edge of the plate 15, a small advancement of the screws brings about a larger movement of the outer edge of the plate to narrow the channel 18. Thus, looseness between the chain 21 and the walls of the channel 18, caused by wear, may be taken up by merely adjusting the screws 25. Proper clearance between the cutter chain and the walls of the guiding channel is essential, because if this clearance becomes too large the channel cannot effectively support the chain, which results both in deterioration of the chain joints and in not firmly carrying the bits or teeth at a proper cutting angle. It will thus be seen that the cooperating rib and groove construction not only provides a strong interlocking connection between the bar 10 and the plate 15, but also permits the plates to be tilted relative to the bar to vary the width of the cutting chain guideway.

Mounted on the forward end of the cutter bar is a cutter head, generally indicated at 28. The cutter head consists of a supporting block 29, having rearwardly extending parallel side edges and a rounded nose portion, and arcuate guide plates 30 secured to the nose portion of the block by suitable securing means, such as bolts 31 extending through the block. The nose and side edges of the supporting block 29 are provided with a groove 32, the ends of which align with the forward ends of the grooves 23 in the supporting bar 10. The guide plates 30 overhang the arcuate edge of the nose portion of the block and are suitably grooved as at 33, to form an arcuate chain guiding channel 34, T-shaped in cross-section. The ends of the arcuate channel 34 align with the forward ends of the longitudinal extending chain guiding channels 18, to provide a continuous, endless chain guideway for the cutter bar. The guide plates 30 are provided with arcuate flanges 35 overlying the arcuate edge of the block 29 to form the bottom of the channel 34. The arcuate flanges 35 have arcuate ribs 36 projecting into the groove 32 to interlock the guide plates 30 with the block 29 similar to the lock between the ribs 22 and the groove 23.

The forward ends of the longitudinally extending guide plates 15 project beyond the forward end of the supporting bar 10 to overhang the top and bottom sides of the supporting block 29. The flanges 19 overhang the parallel side edges of the block 29 and the ribs 22 interlock in the groove 32 along the sides of the block 29. It will be noted that the grooves 33 in the plates 30 are somewhat wider than the corresponding grooves 17 in the plates 15 in order to allow passage of the chain 21 through the arcuate nose channel 34. The forward ends of the grooves 17 may be widened or flared as at 37, to align properly with the ends of the grooves 33.

Screws 38 having suitable tool receiving apertures threadedly engage the forward end of the plates 15 and project into unthreaded apertures 39 in the supporting block 29. Thus, advancement of the screws 38 narrows the width of the forward end of the longitudinal channels 18 formed by the plates 15, the same as the screws 25 are used to adjust the width of the channels 18 rearwardly of the cutter head 28.

The cutter head 28 is connected to the supporting bar 10 by a double ended screw or bolt 40 threaded into suitable apertures in the supporting block 29 and the supporting bar 10. The opposite ends of the screw 40 are reversely threaded, so that adjustment of the screw by means of the central tool engaging enlargement 41 will vary the spacing between the bar 10 and the cutter head 28 to tension properly the endless cutter chain 21. It will be noted that because of the screws 38, such adjustment moves the cutter head 28 and the plates 15 as a unit relative to the supporting bar 10, the screws 25 sliding longitudinally in the undercut groove 13 to permit such movement. Since the guiding channels 18 and 34 are formed by the plates 15 and in the cutter head 28, the channels 18 and 34 also will move as a unit during such adjustment, and hence no gaps or openings in the chain guideways will occur. It also will be noted that this construction avoids the positioning of any endless chain tensioning devices at the cutting machine or rearward end of the cutter bar where the greatest likelihood of breakage occurs.

Although a specific embodiment of the invention is shown and described, it will be realized that the embodiment described is subject to various structural modifications without departing from the spirit of the invention. Therefore, the scope of the invention is as set forth in the following claims.

I claim:

1. A cutter bar for use with a cutting machine and endless cutting chain, comprising; the combination of a supporting bar having the rearward end thereof adapted to be connected to a cutting machine, and a channel guideway extending longitudinally along the lateral edges of said bar and around the forward end thereof to support an endless cutting chain, said guideway being adjustably secured to said bar for longitudinal movement relative thereto to adjust the tension of the chain, and the longitudinally extending sides of said guideways being further adjustably secured to said bar for tiltable movement relative thereto to vary the width of the longitudinally extending portions of said guideway.

2. In a cutter bar for use with a cutting machine and endless cutting chain, the combination comprising; a supporting bar having one end thereof adapted to be connected to a cutting machine, said bar being provided with a longitudinally extending groove in each of the lateral edges thereof, guide plates slidably secured to opposite sides of said bar for longitudinal movement therealong, said plates being mounted in overhanging relationship with said edges to provide cutting chain guideways extending longitudinally along said edges, a longitudinally extending flange on each of said guide plates overlying the corresponding lateral edge, and a longitudinally extending rib on said flange projecting into said groove to interlock said guide plate with said bar to prevent separation therebetween transversely of said edge.

3. The structure set forth in claim 2 including longitudinally extending undercut grooves on opposite side of the bar adjacent the lateral edges thereof, and threaded means projecting into said grooves and movable therealong for securing the guide plates to said bar for longitudinal slidable movement relative thereto, said threaded means being operable to adjustably tilt said plates relative to said bar to vary the width of the cutting chain guideways.

4. A cutter bar for use with a cutting machine and endless cutting chain, comprising; the combination of a substantially flat supporting section having the rearward end thereof adapted to be connected to a cutting machine, the forward end of said section having a rounded nose, a peripheral groove in the longitudinal and nose edges of said section, pairs of guide plates secured to opposite sides of said section in overhanging relationship with said edges to form a cutting chain guiding channel extending along said edges, the said channel having entrance and exit openings for the chain adjacent the rearward end of said section, a flange on each of said guide plates overlying the corresponding edge to form the bottom of said channel, and a rib on said flange projecting into said peripheral groove to interlock said guide plates with said section.

5. A cutter bar for use with a cutting machine and endless cutting chain, comprising; the combination of a supporting bar having the rearward end thereof adapted to be connected to a cutting machine, longitudinally extending grooves in the lateral edges of said bar, longitudinally extending undercut grooves on opposite sides of said bar adjacent said lateral edges, guide plates mounted in pairs on opposite sides of said bar in overhanging relationship with said lateral edges to form longitudinally extending cutting chain guideways along said edges, longitudinally extending flanges on said plates overlying said lateral edges, longitudinally extending ribs on said flanges projecting into said grooves in said lateral edges, means threaded into said plates projecting into said undercut grooves and movable therealong to secure said plates to said bar for longitudinal slidable movement relative thereto, said threaded means being operable to adjustably tilt said plates relative to said bar about an axis substantially parallel to said edges to vary the width of said cutting chain guideways, a cutter head carried by said guide plates adjacent the forward end of said bar, and additional threaded means engaging said cutter head and said bar for effecting relative longitudinal movement therebetween to move said cutter head and said guideways as a unit longitudinally of said bar to adjust the tension of the endless cutting chain movably supported by said cutter head and said guideways.

6. In a cutter bar for use with a cutting machine and endless cutting chain, the combination comprising; a supporting bar having one end thereof adapted to be connected to a cutting machine, guide plates mounted on at least one side of said bar in overhanging relationship with the lateral edges thereof to provide one side of cutting chain guideways extending longitudinally along said edges, means on said bar providing the opposite side of said guideways, interfitting means on said guide plates and said lateral edges to prevent separation of said guide plates and said bar transversely of said edges, said interfitting means being provided with clearances to permit limited pivotal movement of said guide plates relative to said bar about axes substantially parallel to said lateral edges, and threaded means securing said guide plates to said bar, said threaded means being operable to adjustably tilt said guide plates relative to said bar to vary the width of said cutting chain guideways.

7. In a cutter bar for use with a cutting machine and endless cutting chain, the combination comprising; a supporting bar having one end thereof adapted to be connected to a cutting machine, said bar being provided with a longitudinally extending groove in each of the lateral edges thereof, guide plates mounted on opposite sides of said bar in overhanging relationship with said lateral edges to provide cutting chain guideways extending longitudinally along said edges, a longitudinally extending flange on each of said guide plates overlying the corresponding lateral edge, a longitudinally extending rib on each of said flanges projecting into said groove to interlock said guide plates with said bar to prevent separation therebetween transversely of said edge, and threaded means securing said guide plates to said bar, said threaded means being operable to adjustably tilt said guide plates relative to said bar to vary the width of said cutting chain guideways.

8. A cutter bar for use with a cutting machine and endless cutting chain comprising; a supporting bar having one end thereof adapted to be connected to a cutting machine; guide plates slidably secured to opposite sides of said bar for longitudinal movement therealong, said plates being mounted in overhanging relationship with the lateral edges of said bar to provide cutting chain guideways extending longitudinally along said edges; interfitting means on said guide plates and said lateral edges to prevent separation of said guide plates and said bar transversely of said edges, said interfitting means being provided with clearances to permit limited pivotal movement of said guide plates relative to said bar about axes substantially parallel to said lateral edges; threaded means securing said guide plates to said bar, said threaded means being operable to adjustably tilt said guide plates relative to said bar to vary the width of said cutting chain guideways; a cutter head carried by said guide plates adjacent the other end of said bar; and additional threaded means engaging said bar for moving said cutter head and said guideways as a unit longitudinally to said bar to adjust the tension of the endless cutting chain movably supported by said cutter head and said guideways.

FRANK L. FULKE.

REFERENCES CITED

The following references are of record in the file of this patent:

UNITED STATES PATENTS

| Number | Name | Date |
| --- | --- | --- |
| 1,322,819 | Pratt | Nov. 25, 1919 |
| 1,585,917 | Holmes | May 25, 1926 |
| 1,857,376 | Hoy | May 10, 1932 |
| 1,932,187 | Radius | Oct. 24, 1933 |
| 2,289,123 | Jones | July 7, 1942 |
| 2,304,505 | Morrow | Dec. 8, 1942 |